United States Patent [19]

James, Jr. et al.

[11] 3,956,701

[45] May 11, 1976

[54] PERSONAL PAGING RECEIVER WITH SWIVEL CLIP AND DISTRIBUTED ANTENNA

[75] Inventors: Justin Melvin James, Jr., Winchester; Richard LaGrange Smith, Concord; George William Ruggiero, Watertown; Roger Edge Clapp, Cambridge, all of Mass.

[73] Assignee: Bell & Howell Company, Chicago, Ill.

[22] Filed: Sept. 18, 1974

[21] Appl. No.: 506,951

[52] U.S. Cl. ............................... 325/352; 325/361; 343/881; 224/5 H
[51] Int. Cl.² .......................................... H04B 1/08
[58] Field of Search ............. 325/16, 111, 118, 119, 325/352, 353, 354, 361; 343/702, 881, 915, 810; 224/5 H, 26 R

[56] References Cited
UNITED STATES PATENTS

| | | | |
|---|---|---|---|
| 2,128,554 | 8/1938 | Baylis | 343/881 |
| 2,508,918 | 5/1950 | Hines Jr. | 325/352 |
| 2,883,523 | 4/1959 | Meserow | 325/361 X |
| 3,049,711 | 8/1962 | Hooper | 343/702 |
| 3,577,196 | 5/1971 | Pereda | 343/881 X |
| 3,631,994 | 1/1972 | Mackzum Jr. | 324/5 H |
| 3,721,989 | 3/1973 | Christensen | 343/702 X |

Primary Examiner—Benedict V. Safourek
Attorney, Agent, or Firm—Alfred H. Rosen; Frank A. Steinhilper

[57] ABSTRACT

A personal paging device is housed in a case which has one dimension (length) longer than its width or thickness, and a clip is affixed to a side on a swivel between the ends of the length dimension, which allows the device to be worn on the person in a vertical or a horizontal posture. A radio receiving antenna is carried on a flexible dielectric sheet within the casing, and radio components are enclosed within that sheet. A pair of orthogonally-related antenna loops can be provided on the dielectric sheet. The swivel clip can be arranged to cooperate with these or other antennas in a circular-polarization antenna system, such that in one orientation one or the other of the antennas will be detuned.

20 Claims, 10 Drawing Figures

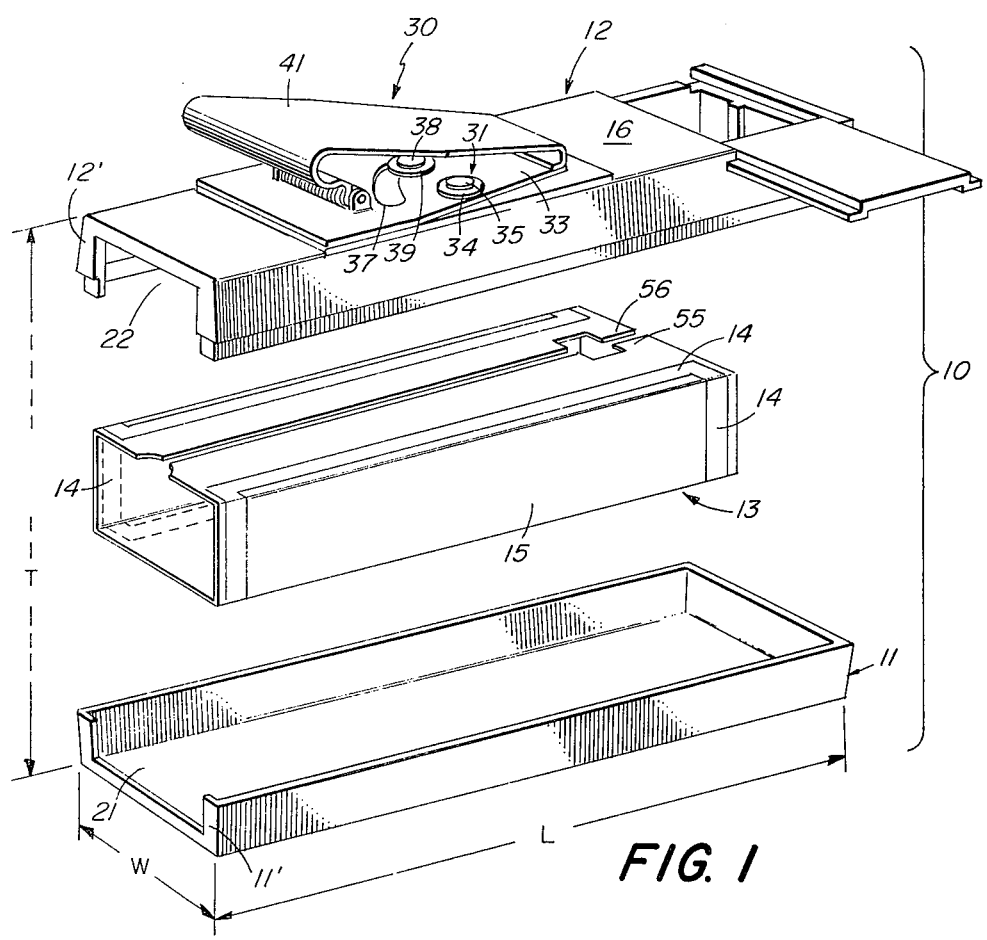
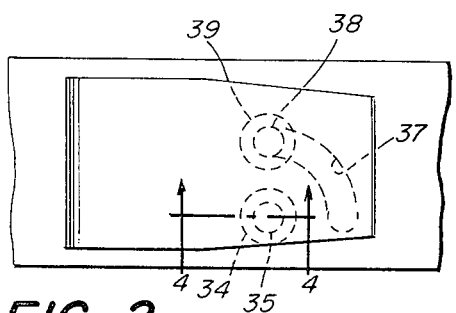
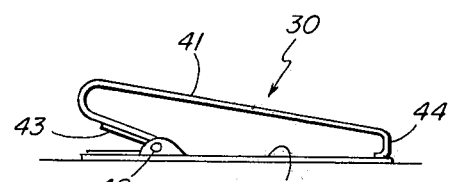
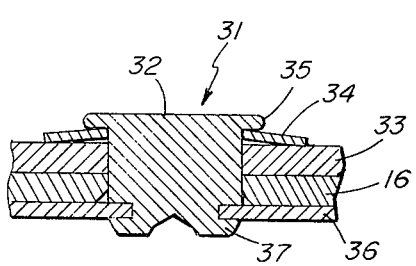

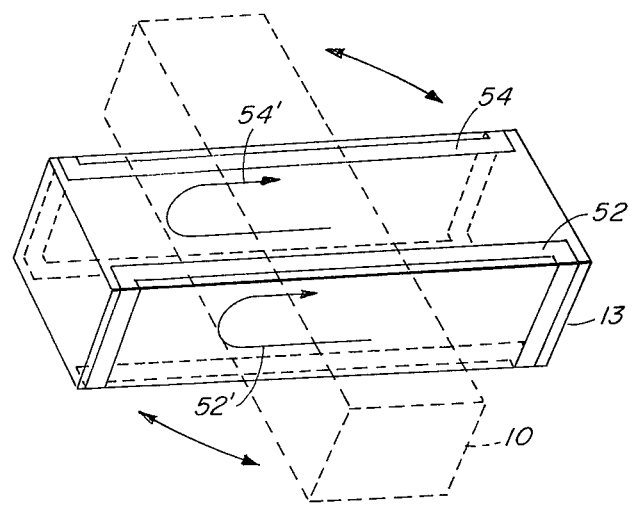
FIG. 8
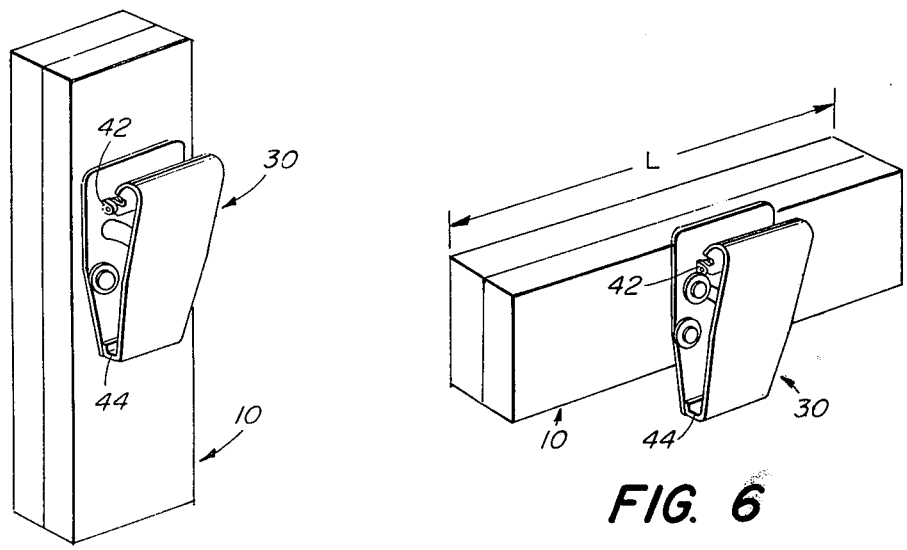
FIG. 7
FIG. 6
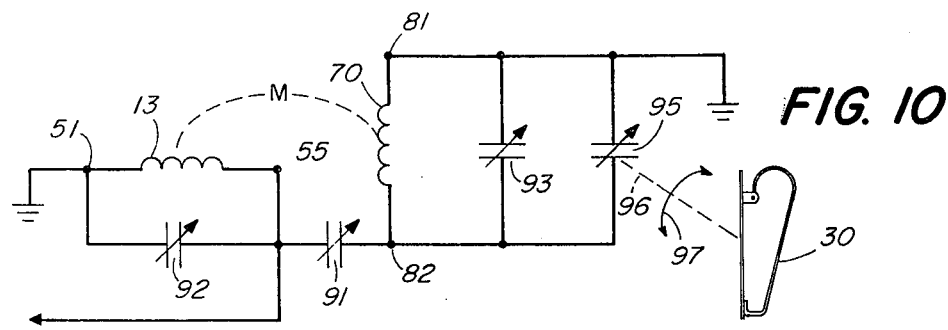
FIG. 10

3,956,701

PERSONAL PAGING RECEIVER WITH SWIVEL CLIP AND DISTRIBUTED ANTENNA

BACKGROUND OF THE INVENTION

This invention relates to radio alerting devices, for example to paging receivers of the kind which can be carried on the person of a user. Customarily, such receivers are small enough to fit into a shirt pocket, or to be clipped to the belt holding up a person's trousers. These devices generally include a casing containing a radio receiver of appropriate design, with a power supply, an antenna and a signalling means, and on the casing some form of fastening means for attaching the casing to another body, usually to an article of clothing worn by the user.

Heretofore, the fastening means has been attached in a fixed relation to the casing, with the result that the orientation of the casing relative to the body of a user has been fixed by the orientation of the fastening means on the clcothing of the user. If a paging receiver attached to a user's belt become uncomfortable when the user assumed a sitting position, the receiver might be shifted to another location, or removed from the user's clothing and placed in a pocket or on a table, for example, but it would be difficult, if not impossible, to adjust the receiver for comfort in the same location.

The shape of radio paging receivers has resembled generally the shape of a cigarette package, perhaps because that shape has evolved with time as having convenient dimensions for an article intended to be carried in the pocket of a person's clothing. That shape is characterized by length and width dimensions which are approximately the same, or at least closely similar, and only the thickness dimension is radically different, being substantially smaller than either of the length and width dimensions. Using similar length and width dimensions, there would not be any advantage in changing the orientation of such a receiver relative to the body of a user.

GENERAL NATURE OF THE INVENTION

The present invention combines to advantage a personal paging device having a casing of which the length dimension is substantially greater than either of its thickness and its width dimensions, with a fastening means that is pivotally mounted to the casing at a location intermediate the ends of the length dimension The fastening means is conveniently in the form of a spring-retained clip or clamp which can be attached to the top edge of a pocket, or to the belt which holds up one's trousers. In the first of these positions, the clip can be turned on its pivot so that the length dimension of the case is essentially vertical. In the second position, the clip can be turned so that the length dimension of the case is essentially horizontal, or parallel to the belt, an orientation which contributes to the comfort of the user whether standing or sitting.

In small-sized radio paging receivers containing the receiving antenna within the casing of the device there is a continuing opportunity to improve coupling to the remote transmitter of paging signals. The present invention adds opportunity to achieve improved coupling, in that the antenna itself can be made longer, and its orientation in space can be varied notwithstanding that the fastening means may be constrained to be affixed to the user's clothing in only one orientation. If desired, the receiver can include antenna means taking into account the orientation of the fastening means relative to the casing, for altering the electrical configuration of the antenna to compensate for such orientation.

BRIEF DESCRIPTION OF THE DRAWINGS

FIG. 1 is an exploded view of a casing, fastening means and an antenna subassembly;

FIG. 2 is a detail of a part of FIG. 1 showing the pivot mechanisms of the fastening means;

FIG. 3 is a side view of the fastening means;

FIG. 4 is an enlarged partial section on line 4—4 of FIG. 2;

FIG. 6 is an outline view of a casing with the fastening means in a first orientation;

FIG. 7 is an outline view of a casing with the fastening means in second orientation;

FIG. 8 illustrates the concept of optional orientation of a casing and an antenna;

FIG. 10 is a schematic circuit illustrating a use of two orthogonally-related antennae.

DETAILED DESCRIPTION OF THE DRAWINGS

Figure 5:
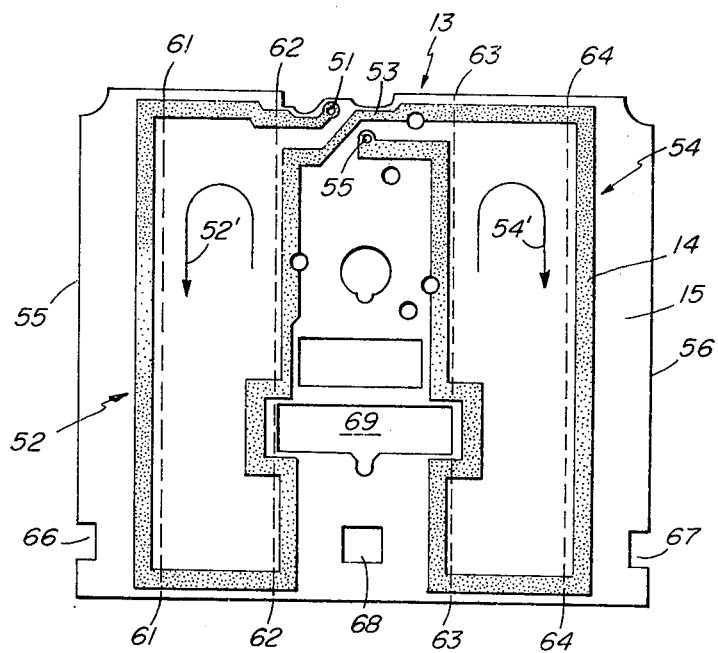
FIG. 5 is a plan of an antenna conductor layout.

FIG. 1 shows the two parts 11 and 12 of a case 10 for a radio paging receiver. The case 10 has a long dimension L which is substantially greater than either of the width dimension W and the thickness dimension T. Each part 11, 12 of the casing is a shallow box approximately ½T deep, and when the parts are assembled they meet approximately in a plane (not shown) that is generally parallel to the length dimension L. The radio receiver components and controls for the radio receiver are not shown, since they form no part of the invention. An opening 21, 22, respectively, is left in the corresponding end wall 11', 12' of each part, for access to the controls (not shown) for the radio receiver. An antenna subassembly 13, which will be described in detail below, is made essentially of an elongated electrical conductor 14 supported on a sheet 15 of dielectric material that is formed in a shape which will fit within and closely adjacent to the walls of the housing parts 11 and 12 when they are assembled.

A fastening means 30 is mounted by a pivot member 31 to the long wide wall 16 of the second part 12 of the casing. As is shown in FIG. 4, the pivot member 31 is a rivet 32 passing through the base 33 of the fastener 30 and the wall 16. A first washer 34 is under the head 35 of the rivet, and a second washer 36 is between the upset tail 37 of the rivet and the under-side of the wall 16. An arcuate slot 37 in the base 33 cooperates with a second similar rivet 38 and washer 39 to constrain rotation of the base 33 around the pivot member 31 to the limits of extent of the slot, which conveniently is 90° of arc. This detail is shown in plan in FIG. 2. A clamping member 41 is pivotally mounted on an axle 42 to the base 33, and a spring 43 urges the clamping member to close on the base at its forward end or lip 44, which is shaped to engage a belt (not shown), or the edge of a fabric such as the top of a shirt or suit pocket (also not shown). These details are best shown in FIG. 3.

The antenna subassembly 13 is shown in plan in FIG. 5. The conductor 14 may be made by printed circuit techniques on a flexible dielectric base 15, which may be selected from among several materials, for example, a polyester film, such as a film of polyethylene terephthalate resin. The conductor is formed in two loops, starting at a first terminal 51, thence counter-clockwise around a first loop 52, thence via a bridging segment 53 to a second loop 54, and finally clock-wise around the second loop to a second terminal 55. The base 15 is folded along dashed lines 61—61; 62—62; 63—63 and 64—64, to form the generally rectangular shape shown in FIG. 1. When the base is folded in this manner, the loops 52 and 54 will be generally parallel to each other, and current flowing between the terminals 51 and 55 will be in the same direction in each loop, as is indicated by the flow arrows 52' and 54', respectively, in FIG. 5 and FIG. 8. When the base 15 is so folded, the long edges 55 and 56 confront each other (FIG. 1), and the portion of the base between fold lines 61—61 and 64—64 and these edges, respectively, can be lifted aside, like doors, to permit access to radio receiver components enclosed within the antenna subassembly. The base 15 is notched and apertured, as at 66, 67, 68, 69, etc., to give access to tuning components and various other parts of the radio receiver.

Figure 9:
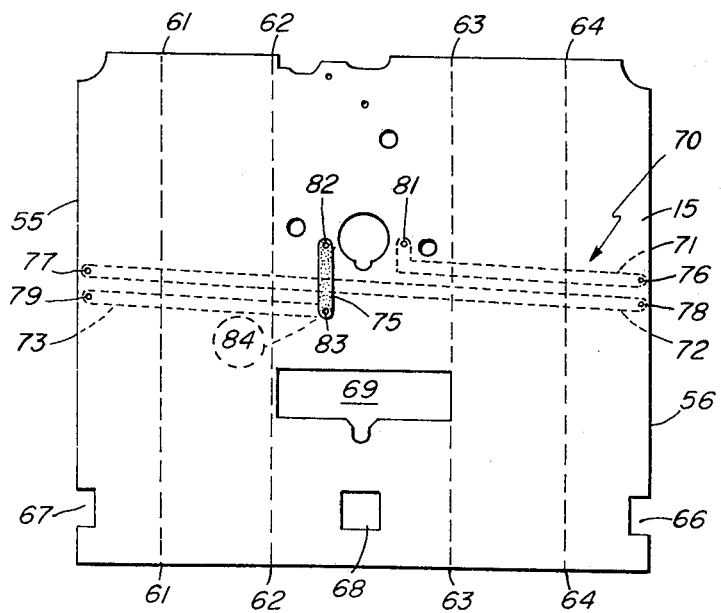
FIG. 9 is a plan of another antenna conductor layout.

FIGS. 6 and 7 illustrate the two extreme positions provided for the fastening means 30 relative to the casing 10. Assuming that the device is normally used with the fastening means oriented so that the forward end or lip 44 is vertically below the axle 42, then the position shown in FIG. 6 is used to orient the casing 10 with its length dimension L horizontal, and the position shown in FIG. 7 is used to orient the casing with its length dimension vertical. The casing 10 and the antenna 13 within it can thus be rotated through 90°, from vertical to horizontal, if desired, as FIG. 8 indicates. When this is done, the antenna loops 52, 54 will change their orientation in space, and that may have an effect on their ability to couple a space-radiated signal with the radio system in the case 10. To increase the options available to the user, a second set 70 of antenna loops may be included, as is illustrated in FIG. 9, where a group of conductors 71, 72 and 73 are shown in dashed line to indicate that they are located on the surface of the base 15 opposite from that surface on which the conductor 14 is supported. A fourth conductor 75 is supported on the base 15, on the same side as the conductor 14. To simplify the illustration, conductor 14 is not shown in FIG. 9, but it will be understood to be present. Like the conductor 14, conductors 71, 72, 73 and 75 may be formed on the base 15 by printed circuit techniques.

When the base 15 is folded along the dashed lines 61—61; 62—62; 63—63 and 64—64 to bring the long edges 55 and 56 together, and to position the loops 52 and 54 parallel to each other oriented in the direction of the length dimension L, the conductors 71, 72 and 73 are joined by linking conductors (not shown) which bridge the gap between the long edges 55, 56, one connecting terminal point 76 of the first conductor 71 to terminal point 77 of the second conductor 72, and another connecting terminal point 78 of the second conductor 72 to terminal point 79 of the third conductor 73, to form two loops of a second antenna 70 that are oriented transverse to the length dimension L. The terminals 81 and 82 of this second antenna are, respectively, at an end of the first conductor 71 and at an end of the fourth conductor 75. To complete the circuit of this antenna, the fourth conductor 75 is joined to the third conductor 73 through the base 15 via their ends 83 and 84 that confront each other at opposite sides of the base. This connection can be made through a hole (not shown) in the base 15, using a known technique of plating through the hole.

As is seen in FIG. 9, the aperture configuration of the base may be modified to accomodate additional conductors. To prevent abrasion of the antenna conductors, or undesired contact between the antenna conductors and a component or components of the radio apparatus that is enclosed in the base 15, either or both of the antennas 13, 70 may be covered with an insulator (not shown). When the second antenna 70 is used, it is preferably on the outer side of the base 15 when the latter is folded, to give easy access to the terminal points 76, 77, 78 and 79, for making the connections described above.

With two antennas 13 and 70 present and having their respective loops oriented on axes that are essentially orthogonal to each other, many known techniques for using such an array of antennas can be employed. The terminals 51, 55 of one antenna 13, and the terminals 81, 82 of the other, are all available inside the casing 10, for such use as may be desired. In the simplest case, one may employ a switch to choose one antenna or the other. Such a switch might be actuated by the fastening means 30 in or near its respective extreme positions. Alternatively, one might employ a more sophisticated antenna coupling arrangement, such as that which is illustrated in FIG. 10, where the antennas 13 and 70 are represented by symbols for inductors one perpendicular to the other. Each antenna is tuned with a capacitor 92, 93, respectively. One terminal 51, 81 of each antenna is grounded. The remaining terminals 55, 82 are joined by a capacitor 91 which effects essentially a 90° phase shift between the two antennas, to provide a circularly-polarized antenna system. A third capacitor 95 is mechanically coupled (via a link represented by a dashed line 96) to the fastening means 30. Rotation of the fastening means relative to the antennas 13 and 70 (which are fixed in the case 10), as is represented by a curved double-headed arrow 97, adjusts the capacitance of the third capacitor 95. The third capacitor can be used in this way as a spoiler, to detune the second antenna 70 when the case 10 is vertically oriented as shown in FIG. 7. Clearly, this is but one of several possible choices available to the designer. One might, for example, add a fourth capacitor (not shown) across the first antenna tuning capacitor 92, to spoil or detune the long loops of the first antenna when the receiver is in the horizontal position shown in FIG. 6. Coupling between the loops of the antennas 13 and 70 might be achieved in whole or in part by mutual inductance M between them, suitable magnitude of which would be designed into the assembly of the two antennas on the dielectric support 15.

While the cooperative relation between two orthogonally-related antennas in the case 10 and the swiveling fastening means 30 has been illustrated with reference to a pair of antennas supported on a dielectric sheet 15, it will be understood that the same relationship can be established between a pair of antennas having another form (e.g.: coils on ferrite cores) and the fastening means 30.

We claim:

1. A personal paging device of the kind having radio receiving means within a casing intended to be carried by a person, comprising a casing having a length dimension which is substantially greater than either of its thickness dimension and its width dimension, means for attaching said casing to another body, means pivotally mounting said attaching means to said casing at a location intermediate the ends of said length dimension, said mounting means providing limited freedom to rotate said attaching means relative to said casing through only approximately one-quarter circle, so that with said attaching means attached to an article of clothing worn by a person said casing can be disposed with said length dimension horizontal when said attaching means is at one limit of said freedom, and vertical when said attaching means is at a second limit of said freedom.

2. A device according to claim 1 including radio antenna means carried by said casing having at least one elongated conductor extending substantially coextensive with said length dimension.

3. A device according to claim 2 including two antennas supported in fixed relation to said casing and orthogonally related one to the other, and means coupling said antennas in a circularly-polarized array, means to tune each antenna, and means responsive to the orientation of said attaching means relative to said casing for altering the tuned status of at least one of said antennas from a tuned status when said attaching means is at one limit of said freedom to a substantially de-tuned status when said attaching means is at a second limit of said freedom.

4. A device according to claim 2 wherein said antenna means comprises flexible conductor means carried on a flexible support in the form of a sheet of dielectric material close to one or more of the inner walls of said casing.

5. A device according to claim 4 wherein said sheet is foldable along a plurality of substantially parallel foldlines to form a series of elongated panels which will conform with the inner long walls of said casing, said conductor having two ends which are both located in an intermediate one of said panels, said conductor extending in a first loop over at least one of the panels to one side of said intermediate panel counterclockwise from one of said ends to a region between both of said ends, said conductor extending in a second loop from said region over at least one of said panels to the other side of said intermediate panel clockwise to the other one of said ends.

6. A device according to claim 5 in which said sheet has four of said fold lines defining five said panels, the inner-most two of said lines bounding said intermediate panel, each of said loops having two long segments which are substantially coextensive with said length dimension and of which one long segment is on said intermediate panel and one long segment is on an outermost panel, each of said loops having two shorter segments which extend over the panel that is between said intermediate panel and the respective outermost panel.

7. A device according to claim 3 wherein said antenna means comprises a plurality of elongated conductors some extending in the direction of said length dimension and others extending transversely to said length dimension, and means to connect said conductors to form two sets of loops having their respective major axes orthogonally related to each other.

8. A device according to claim 7 including means for altering the electrical connection of said antenna conductors to said ratio receiving means.

9. A device according to claim 7 including a flexible dielectric support in sheet form lining at least part of the interior of said casing, the conductors of one of said sets of loops being on one side of said support, and the conductors of the other of said sets of loops being on the other side of said support.

10. A device according to claim 1 in which said casing is in two parts each embracing said length dimension and intended to mate with the other in a plane including one of the thickness and width dimensions, said fastening means being mounted to a wall of one of said parts that is parallel to said plane.

11. A device according to claim 5 in which said casing is in two parts each embracing said length dimension and intended to mate with the other in a plane including one of the thickness and width dimensions, said flexible sheet when folded being in a configuration substantially to the interior boundaries of said casing for assembly by locating said sheet in a first of said parts, and covering the same with a second of said parts to complete said casing.

12. A device according to claim 11 in which said fastening means is mounted to a wall of one of said parts that is parallel to said plane.

13. A device according to claim 11 in which said sheet has an opening in a portion that is parallel to said plane, for access to said radio receiving means within said space.

14. In a radio apparatus, a case forming the housing for said apparatus, a flexible sheet of dielectric liner for said case, for surrounding radio apparatus in said housing, and radio antenna means comprising one or more flexible conductors supported on said liner, at least one of said conductors forming a set of two serially-connected loops disposed in responsive planes that are substantially parallel to each other when said sheet surrounds said apparatus, said loops being interconnected such that when they are so disposed in said planes currents induced in said loops by coupling with an electromagnetic field will flow in the same direction in said conductor.

15. In a radio apparatus according to claim 14, radio antenna means comprising at least two separate sets of loops of respectively different one of said conductors, one set being on one side of said liner and the other set being on the other side of said liner.

16. In a radio apparatus according to claim 15, each of said sets of loops having an axis that is angularly related to the axis of the other set.

17. Apparatus according to claim 16 including means coupling said loops in a circularly-polarized antenna array, means to tune each loop, and means for altering the tuned status of at least one of said sets of loops.

18. Apparatus according to claim 14 wherein said sheet is capable of lying flat and of being folded on prescribed lines for surrounding said radio apparatus, and when said sheet is flat said loops are disposed on respectively different areas on the same side of said sheet, one of said loops being wound clockwise and the other of said loops being wound counter-clockwise.

19. Apparatus according to claim 14 wherein said loops are disposed respectively on different sides of radio apparatus surrounded by said sheet.

20. Apparatus according to claim 18 wherein said sheet is foldable on said prescribed lines to present confronting sheet portions covering a part of said radio apparatus when the latter is present, for giving access to the radio apparatus by unfolding said confronting portions.

* * * * *

UNITED STATES PATENT OFFICE
CERTIFICATE OF CORRECTION

Patent No. 3,956,701      Dated May 11, 1976

Inventor(s) Justin Melvin James, Jr., et al.

It is certified that error appears in the above-identified patent and that said Letters Patent are hereby corrected as shown below:

Column 1, line 22, "become" should read -- became --.

Column 6, line 15, after "configuration" insert -- conforming --.

Column 6, line 33, "responsive" should should read -- respective --.

Signed and Sealed this

Twenty-first Day of September 1976

[SEAL]

Attest:

RUTH C. MASON
*Attesting Officer*

C. MARSHALL DANN
*Commissioner of Patents and Trademarks*